United States Patent
Amos (10) Patent No.: US 10,841,158 B1
(45) Date of Patent: Nov. 17, 2020

(54) SYSTEMS AND METHODS FOR NODE MAINTENANCE IN A NETWORK

(71) Applicant: SYNAPSE WIRELESS, INC., Huntsville, AL (US)

(72) Inventor: Jason Ryan Amos, Albertville, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 254 days.

(21) Appl. No.: 15/799,270

(22) Filed: Oct. 31, 2017

(51) Int. Cl.
*H04L 12/24* (2006.01)
*H04L 12/12* (2006.01)
*H04L 12/26* (2006.01)
*H04L 12/18* (2006.01)
*H04L 12/44* (2006.01)

(52) U.S. Cl.
CPC ............ *H04L 41/082* (2013.01); *H04L 12/12* (2013.01); *H04L 41/0816* (2013.01); *H04L 41/5012* (2013.01); *H04L 43/0835* (2013.01); *H04L 12/1868* (2013.01); *H04L 12/44* (2013.01)

(58) Field of Classification Search
CPC ...... H04L 41/082; H04B 10/27; H04W 52/02; H04W 52/00; H04W 52/023
See application file for complete search history.

(56) References Cited

U.S. PATENT DOCUMENTS

| 8,792,401 | B2 | 7/2014 | Banks et al. | |
|---|---|---|---|---|
| 9,619,989 | B1 | 4/2017 | Ewing et al. | |
| 10,263,844 | B1* | 4/2019 | Wu | H04L 41/082 |
| 2003/0152041 | A1* | 8/2003 | Herrmann | H04L 12/2803 370/310 |
| 2004/0081193 | A1* | 4/2004 | Forest | H04J 3/0652 370/458 |
| 2008/0307075 | A1* | 12/2008 | Urano | G06F 1/14 709/220 |
| 2009/0228695 | A1* | 9/2009 | Pathak | G06F 1/3284 713/1 |
| 2010/0131084 | A1* | 5/2010 | Van Camp | G06F 8/65 700/86 |
| 2010/0214317 | A1* | 8/2010 | Miura | H04L 12/2816 345/641 |
| 2010/0313063 | A1* | 12/2010 | Venkataraja | G06F 9/5072 714/4.1 |

(Continued)

*Primary Examiner* — Jael M Ulysse
(74) *Attorney, Agent, or Firm* — Maynard Cooper & Gale, P.C.; Jon E. Holland (57) ABSTRACT

Systems and methods for performing node maintenance on network nodes in a communication network are provided. The network nodes can be in communication with a node management device that can control when each network node is in a sleep state and in an awake state as part of a check-in cycle where the network nodes report to the node management device. When maintenance is required on the network nodes, the node management device can increase the amount of time used during the check-in cycle to account for the time needed to perform maintenance on one of the network nodes. The node management device can then use this additional time to perform the required maintenance on one of the network nodes. The remaining network nodes that are not receiving the required maintenance are provided with an extended sleep time to permit the one network node to receive maintenance.

14 Claims, 6 Drawing Sheets

(56) References Cited

U.S. PATENT DOCUMENTS

| | | | |
|---|---|---|---|
| 2011/0255456 A1* | 10/2011 | Banks | H04W 52/0235 370/311 |
| 2012/0130725 A1* | 5/2012 | Cooper | G06Q 10/10 705/1.1 |
| 2013/0179877 A1* | 7/2013 | Dain | G06F 8/60 717/178 |
| 2013/0279918 A1* | 10/2013 | Mizutani | H04J 14/0278 14/278 |
| 2014/0073262 A1* | 3/2014 | Gutierrez | G08B 21/0247 455/67.11 |
| 2014/0354187 A1* | 12/2014 | Aggarwal | H05B 47/175 315/312 |
| 2015/0264711 A1* | 9/2015 | Lampin | H04W 72/06 370/336 |
| 2015/0378715 A1* | 12/2015 | Solnit | G08B 17/10 713/2 |
| 2016/0057000 A1* | 2/2016 | Piekarski | H04L 41/082 709/221 |
| 2016/0174148 A1* | 6/2016 | Seed | H04W 52/0203 370/311 |
| 2017/0012829 A1* | 1/2017 | Skaaksrud | H04L 41/12 |
| 2018/0007147 A1* | 1/2018 | Sareen | H04L 41/082 |
| 2018/0007162 A1* | 1/2018 | Olmsted-Thompson | H04L 67/2861 |
| 2018/0295011 A1* | 10/2018 | Wang | H04L 41/044 |

* cited by examiner

SYSTEMS AND METHODS FOR NODE MAINTENANCE IN A NETWORK

BACKGROUND

The present application generally relates to systems and methods for node maintenance in a network.

A communication network can have a plurality of network nodes that can have several different configurations (e.g., star configuration, mesh configuration, etc.). In each of these configurations, the network nodes can communicate with a corresponding node management device, which may be a network access device (e.g., a gateway), a coordinator or other device configured to manage the network nodes. In some cases, such as when a node management device is implemented as a gateway, the node management device may provide access to other portions of the network or other networks. The node management device can be used to perform management functions for the network nodes such as the providing of configuration and/or software updates to the network nodes, facilitate communication between the network nodes and other portions of the communication network and/or other networks and/or devices, coordinate communication times by the network nodes, and/or control operational states of the network nodes (e.g., entering and exiting a sleep state).

When the communication network is configured as a sleepy node network, where the nodes of the network go to sleep from time-to-time, the node management device can be responsible for controlling the awake time and sleep time for each of the individual network nodes. Often, in a sleepy node network, each of the network nodes can be required to check-in with the node management device on a predetermined cycle, which can be referred to as a check-in cycle. The node management device can control the sleep and awake times for each of the network nodes such that each network node is provided with a window during a check-in cycle to communicate with the node management device.

However, when maintenance (e.g., software upgrades, configuration upgrades, etc.) is required for the network nodes, the corresponding communication window for each network node is typically not large enough to accommodate the required maintenance. One technique to perform the required maintenance on each network node is to extend the communication window of each network node in the check-in cycle in order to perform the maintenance. However, the overall time period required to complete the check-in cycle can be dramatically extended if there are a lot of nodes in the communication network. In addition, the extending the time period required to complete the check-in cycle can also be problematic if the network nodes are performing safety functions where extended periods of non-reporting due to the extended check-in cycle are undesirable or if the network nodes are required to report to the node management device within a specified time period according to a contractual obligation, which specified time period cannot be met due to the extended time period.

SUMMARY

The present application generally pertains to systems and methods for performing node maintenance on network nodes in a communication network. A node management device can control when each network node is in a sleep state and in an awake state. For example, the node management device can control when each network node wakes up (i.e., enters an awake state), when each network node goes to sleep (i.e., enters a sleep state) and how long the network node should stay asleep (i.e., the length of the sleep state). By controlling the times when each network node is in an awake state and in a sleep state, the node management device can implement a check-in cycle that provides each of the network nodes with a communication window to communicate with the node management device.

When maintenance is required on the network nodes, the node management device can increase the amount of time used for the check-in cycle to account for the time needed to perform maintenance on one (or more) of the network nodes. The node management device can then use this additional time (referred to as a maintenance window) to perform the required maintenance on one of the network nodes. The remaining network nodes that are not receiving the required maintenance are provided with an extended sleep time during an initial check-in cycle such that the remaining network nodes do not wake up until after the required maintenance on the selected network node has been completed during a subsequent check-in cycle. In other words, the normal wake-up times for the remaining network nodes (i.e., the network nodes not being maintained) during a check-in cycle are delayed by a time period corresponding to the maintenance window. The extending of the check-in cycle by the maintenance window is then repeated until each of the network nodes has been maintained.

In another embodiment using a sleepy node network, a coordinator (or node management device) controls the network nodes to sequentially wake from a sleep state and check-in with the coordinator once per check-in cycle. For each check-in cycle, one node can be provided with additional time for maintenance operations, such as software upgrades. Every check-in cycle, maintenance on a different node is performed such that the maintenance operations are spread over many check-in cycles with minimal impact to the length of a single check-in cycle.

In a further embodiment, one method for upgrading and doing system maintenance on the nodes in a sleepy node network is provided. Specifically, for a gateway centric system where the gateway largely controls node checking and acknowledgements, the nodes may check in synchronously or asynchronously to provide their data. The gateway can be a master node, often a bridge between network types or at a minimum a local server for rules processing, in one embodiment. Upon receiving data from a node, the gateway can assign the time for the next check-in by that node. All of the nodes can be scheduled or delayed in the future for the maintenance of one node to occur. For example, if there were many nodes (e.g., 300 nodes) connected to a gateway that were to report in every 5 minutes. The typical behavior for each network node would be to check in every 300 seconds and sleep between the check-ins. Upon receipt of check-in data, the gateway would respond with an acknowledgement and time to next check-in (i.e., a sleep time). For the first node, the check-in time would still be 300 seconds, however, the second node would be commanded to check-in at say 330 seconds to allow approximately 30 seconds to perform maintenance on the first node. The third node would also be command to check-in at 330 seconds and so on. The 30 seconds used to performance maintenance is exemplary and the time window would be appropriate (e.g., larger or smaller) for the maintenance required.

The present application also generally pertains to systems and methods for network nodes to communicate using a data windowing technique. When a network node is communicating with the node management device during a communication window, the network node can use a data windowing technique to send packets to the node management device. When using the data windowing technique, the network node sends a message to the node management device informing the node management device of how many packets the network node will be sending to the node management device. The node management device can then send an application layer acknowledgement to the network node indicating that the initial message from the network node has been received. After receiving the acknowledgement, the network node then proceeds to send the remaining packets to the node management device. The network node can send the initial packet and the subsequent packets to the node management device using a directed multicast format. The use of the directed multicast format does not require the node management device to send a protocol or data-link layer acknowledgement after the receipt of each packet. Once the packets have been received by the node management device, the node management device then determines if all of the packets promised in the initial message from the network node have been received by the node management device. If all packets have been received by the node management device, the node management device send an acknowledgement to the network node. However, if all of the packets have not been received, the node management device send a message to the network node indicating those packets that have not been received by the node management device. The network node can then retransmit only the missing packets to the node management device.

One advantage of the present application is that node maintenance can be performed on many nodes with a minimal impact on the length of the time period for the check-in cycle.

Another advantage of the present application is that network nodes can communicate packets to the node management device without requiring the node management device to acknowledge each packet, thereby decreasing the time required for a network node to communicate during a communication window.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
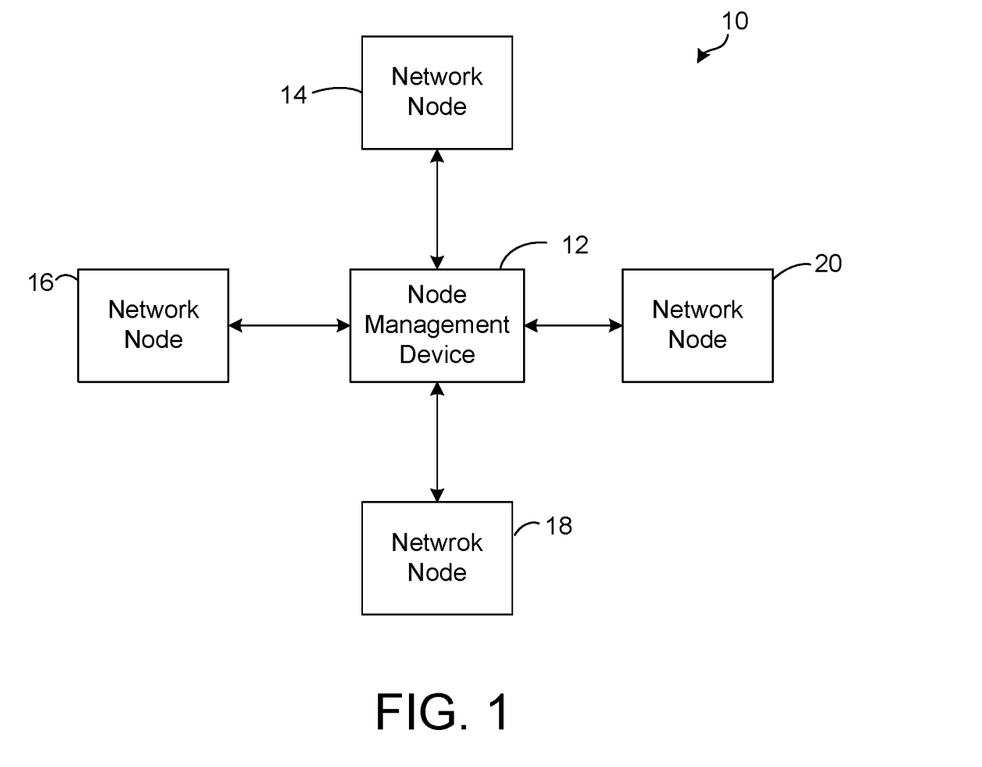
FIG. 1 is a block diagram showing an embodiment of a communication network.

An embodiment of a communication network 10 is shown in FIG. 1. The network 10 includes a node management device 12 in communication with a plurality of network nodes 14, 16, 18, and 20. In one embodiment, the network nodes 14, 16, 18, and 20 can be stationary (i.e., the position of the node does not change), but, in other embodiments, any of the network nodes 14, 16, 18, and 20 may be portable (i.e., the position of the node can change). FIG. 1 depicts four network nodes 14, 16, 18, and 20 for simplicity, but the network 10 may have any number of network nodes communicating with the node management device 12 in other embodiments. In one embodiment, each network node 14, 16, 18, and 20 may be positioned at a specific location at or within a facility, e.g., a particular room or area of a building. Some examples of networks that can be used with the present application are described in commonly-assigned U.S. Pat. No. 9,619,989, entitled "Asset Tracking Systems and Methods," and granted on Apr. 11, 2017, and commonly-assigned U.S. Pat. No. 8,792,401, entitled "Systems and Methods for Reducing Power Consumption in Communication Networks," granted on Jul. 29, 2014, and both of which patents are incorporated herein by reference.

In the embodiment shown in FIG. 1, the network 10 can be implemented as a star network, but other types of networks (e.g., a mesh network or an ad hoc network) may be implemented in other embodiments. In the star network, each network node 14, 16, 18, and 20 is able to communicate directly with the node management device 12 without having to use an intermediate node to facilitate communications. In one embodiment, the network nodes 14, 16, 18, and 20 can communicate with the node management device wirelessly (i.e., via electromagnetic or acoustic waves carrying a signal), but it is possible for any of the network nodes 14, 16, 18, and 20 to communicate with the node management device 12 over a conductive medium (e.g., a wire or fiber, or otherwise). The network nodes 14, 16, 18, and 20 can be used for several different purposes. For example, the network nodes 14, 16, 18, and 20 may be connected to one or more sensors or cameras to facilitate the communication of information from the sensors or cameras to the node management device 12.

In one embodiment, the node management device 12 can be a gateway, a network access device, a coordinator or other similar type of device. The node management device 12 can be responsible for the management of the network nodes 14, 16, 18, and 20 communicatively coupled to the node management device 12. For example, the node management device 12 may be responsible for providing configuration and/or software updates to the network nodes 14, 16, 18, and 20, facilitating communications by the network nodes 14, 16, 18, and 20 to other networks or other portions of the current network, coordinating communication times by the network nodes 14, 16, 18, and 20, and controlling an operational state of the network nodes 14, 16, 18, and 20 (e.g., entering and exiting a sleep state).

In one embodiment, the node management device 12 is operable to cause the network nodes 14, 16, 18, and 20 to switch between an awake mode and a sleep mode from time-to-time. During the awake mode, the node management device 12 can send, receive, and route communications (although communication is not guaranteed for a variety of reasons, including radio interference, bad connections, etc.). Similarly, the network nodes 14, 16, 18, and 20 can send, receive, and route communications (if in a mesh network configuration) during the awake mode. During the sleep mode, the network nodes 14, 16, 18, and 20 cannot send, receive, and route communications, but consume less power than when in the awake mode. In some embodiments utilizing a mesh network configuration, the node management device 12 may cause only a subset or group of the network nodes to switch between the awake mode and the sleep mode thereby providing communication over only a portion of the mesh network.

In one embodiment, the network nodes 14, 16, 18, and 20 can be required to communicate (or check-in) with the node management device 12 once during a predetermined time period (referred to as a check-in cycle). The node management device 12 can control the network nodes 14, 16, 18, and 20 such that the network nodes 14, 16, 18, and 20 enter the awake state at different times to communicate with the node management device 12. By controlling the times when the network nodes 14, 16, 18, and 20 can communicate with the node management device 12, data collisions can be avoided.

Figure 6A:
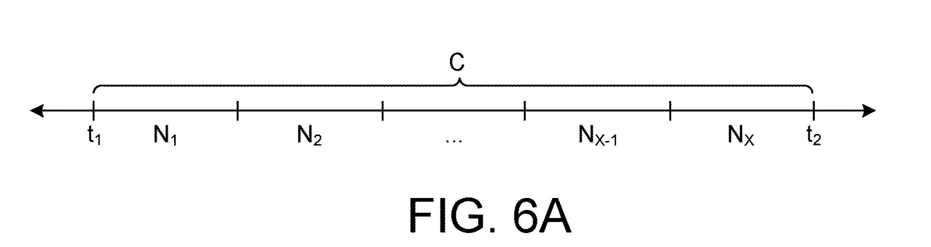
FIGS. 6A-6C schematically show embodiments of check-in cycle timelines before and during an upgrade procedure.

FIG. 6A shows an embodiment of a check-in cycle for network nodes in a communication network. The check-in cycle can extend for a time period C. In FIG. 6A, each of the network nodes has a corresponding communication window ($N_1$-$N_x$) to communicate with the node management device 12. While each of the communication windows ($N_1$-$N_x$) shown in FIG. 6A extends for the same time period (i.e., they have the same length), the communication windows ($N_1$-$N_x$) for individual network nodes can have different time periods (or lengths) in other embodiments. Each of the network nodes can wake at the corresponding start time associated with the beginning of their communication window ($N_1$-$N_x$) during the check-in cycle and communicate information or data to the node management device 12. Once each network node has finished communicating with the node management device 12, the node management device 12 sends a message to the network node commanding the network node to enter the sleep mode. The message from the node management device 12 can also provide the network node with the next time when the network node should wake to communicate again with the node management device 12. In other words, the node management device 12 can send at least one sleep command to the network node that causes the network node to transition to and remain in the sleep mode for a specified sleep period and then automatically transition back to the awake mode after the specified sleep period once the network node has finished communicating with the node management device 12. If the time period C for the check-in cycle does not change, the network node can be instructed to wake at a time that corresponds to the last starting time plus a time period substantially equal to the check-in cycle time period C minus the time the network node was awake during the network node's communication window ($N_1$-$N_x$). The check-in cycle can be repeated as described above until an intervening event (e.g., the need for node maintenance) occurs.

In one embodiment, the sleep command may include payload data indicating various characteristics of the sleep state. For example, the sleep command may include a value indicative of the duration for the sleep state. Before transitioning to a sleep state in response to the sleep command, the network node may appropriately set parameters within the network node such that the node automatically wakes based on such value in the sleep command. In a further embodiment, the sleeping characteristics of the network node may be defined prior to the broadcast of the sleep command such that the sleep command used to put the network node to sleep does not need to include any data indicative of the sleeping characteristics. In another embodiment, sleeping characteristics are predefined but may be updated, when desired, by information in the sleep command.

In another embodiment, the network nodes 14, 16, 18, and 20 may be configured so that the sleep and/or awake periods can be varied for different sleep cycles to increase or decrease power consumption by the network nodes as may be desired. If the sleep period is increased, the network nodes 14, 16, 18, and 20 remain in the sleep mode for a longer time period and, as a result, consume less power. If the sleep period is decreased, the network nodes 14, 16, 18, and 20 remain in the sleep mode for a shorter period of time and consume more power.

Figure 2:
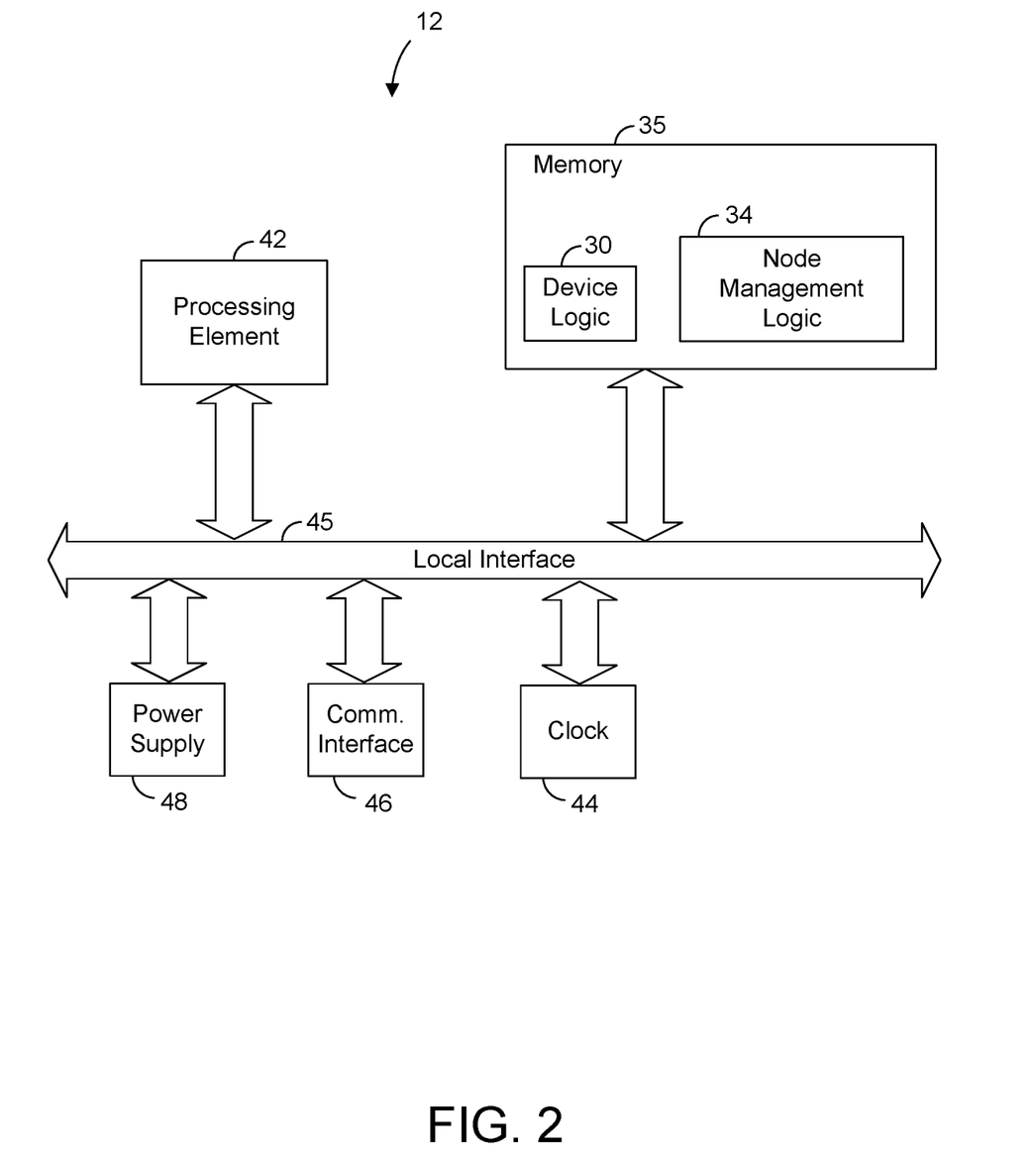
FIG. 2 is a block diagram showing an embodiment of a node management device in the communication network of FIG. 1.

FIG. 2 depicts an embodiment of the node management device 12. The node management device 12 shown by FIG. 2 can include logic 30, referred to herein as "device logic," for generally controlling the operation of the node management device 12. The node management device 12 also includes logic 34, referred to herein as "node management logic," for controlling the operation of the network nodes 14, 16, 18, and 20. The node logic 30 and the node management logic 34 may be implemented in software, firmware, hardware, or any combination thereof. In FIG. 2, the node logic 30 and the node management logic 34 are implemented in software and stored in memory 35. However, other configurations of the node logic 30 and the node management logic 34 are possible in other embodiments.

Note that the node logic 30 and the node management logic 34, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The node management device 12 includes at least one conventional processing element 42, which includes a processor and/or one or more physical hardware components that can read and execute instructions stored in the memory 35. As an example, the processing element 42 may include a central processing unit (CPU), microprocessor, microcontroller, or a digital signal processor (DSP). The processing element 42 communicates to and drives the other elements within the node management device 12 via a local interface 45, which can include at least one bus.

The node management device also has a communication interface 46. The communication interface 46 can include a radio frequency (RF) radio or other device for communicating wirelessly. Using the communication interface 46, the node management device 12 may communicate with the network nodes 14, 16, 18, and 20. The node management device 12 may also include a clock 44 for use in determining communication windows for the network nodes 14, 16, 18, and 20.

The node management device 12 can have a power supply 48, which provides electrical power to the components of the node management device 12. In one embodiment, the power supply 48 has an interface that allows it to plug into or otherwise interface with an external component, such as a wall outlet or battery, and receive electrical power from such external component. If desired, the power supply 48 may incorporate one or more batteries to permit the node management device 12 to be independent of the external power component.

The node management logic 34 can be used to control the operation of the network nodes 14, 16, 18, and 20. The node management logic 34 can be responsible for the maintenance of the network nodes 14, 16, 18, and 20. Some maintenance items that can be performed by the node management logic 34 include software upgrades, configuration upgrades, firmware upgrades, upgrades to sensor reading measurements, user upgrade scripts or other similar types of maintenance items. The node management logic 34 can also control when the network nodes 14, 16, 18, and 20 are in a sleep state or in an awake state and when the network nodes 14, 16, 18, and 20 receive maintenance. The node management logic 34 can also receive and process information from the network nodes 14, 16, 18, and 20.

Figure 3:
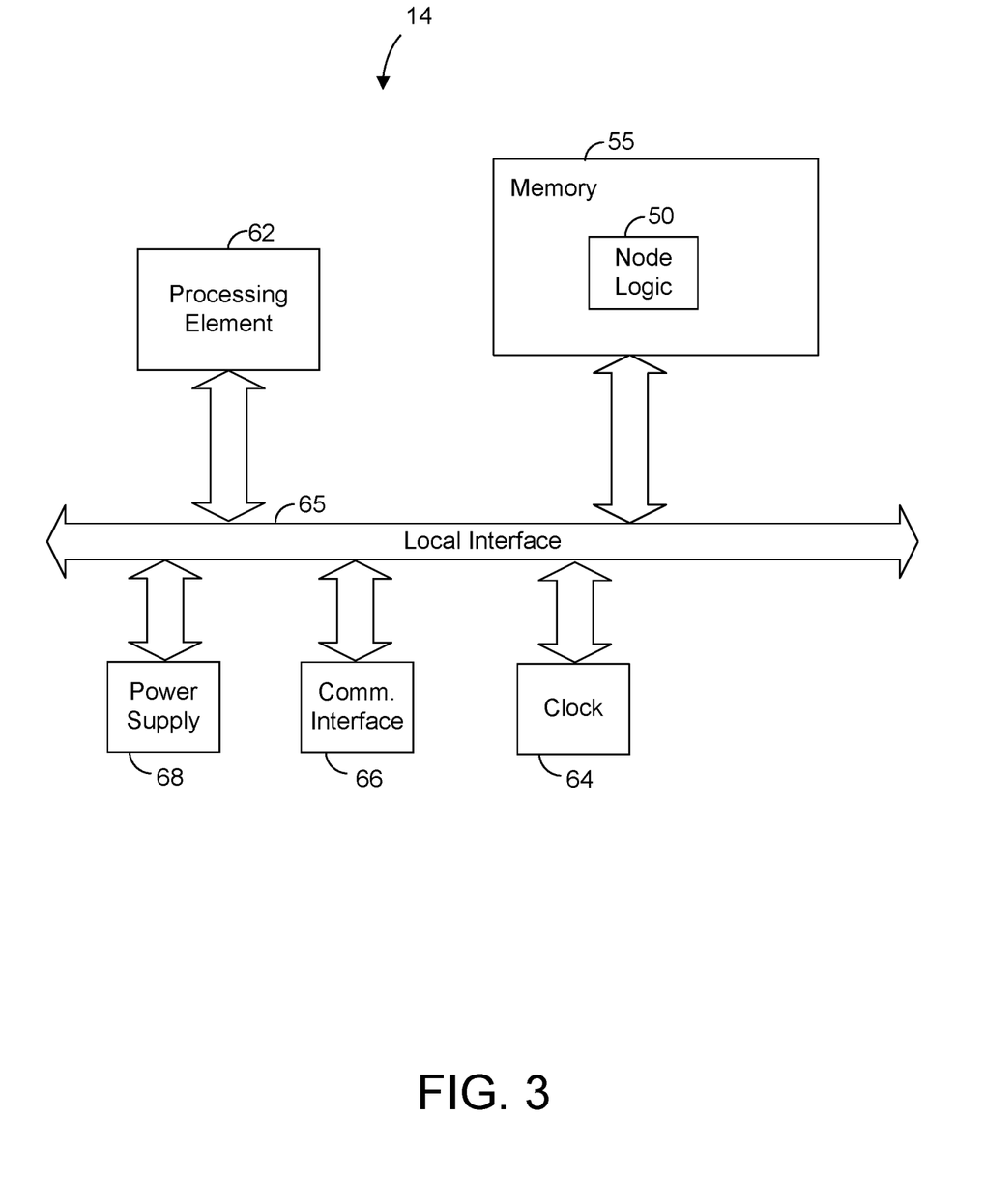
FIG. 3 is a block diagram showing an embodiment of a network node in the communication network of FIG. 1.

FIG. 3 depicts an embodiment of one of the network nodes 14 of the network 10. Note that any of the other nodes 16, 18, and 20 may be configured similarly to or identical to the node 14 depicted by FIG. 3. The network node 14 shown by FIG. 3 can include logic 50, referred to herein as "node logic," for generally controlling the operation of the node 14. The node logic 50 may be implemented in software, firmware, hardware, or any combination thereof. In FIG. 2, the node logic 50 is implemented in software and stored in memory 55. However, other configurations of the node logic 50 are possible in other embodiments. Note that the node logic 50, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The network node 14 includes at least one conventional processing element 62, which includes a processor and/or one or more physical hardware components that can read and execute instructions stored in the memory 55. As an example, the processing element 62 may include a central processing unit (CPU), microprocessor, microcontroller, or a digital signal processor (DSP). The processing element 62 communicates to and drives the other elements within the network node 14 via a local interface 65, which can include at least one bus.

The network node 14 also has a communication interface 66. The communication interface 66 can include a radio frequency (RF) radio or other device for communicating wirelessly. Using the communication interface 66, the network node 14 may communicate with the node management device 12. The network node 14 can include a clock 64 to determine when the network node 14 should wake and communicate with the node management device 12.

The network node 14 can have a power supply 68, which provides electrical power to the components of the network node 14. In one embodiment, the power supply 68 has an interface that allows it to plug into or otherwise interface with an external component, such as a wall outlet or battery, and receive electrical power from such external component. If desired, the power supply 68 may incorporate one or more batteries to permit the network node 14 to be independent of the external power component.

Figure 4:
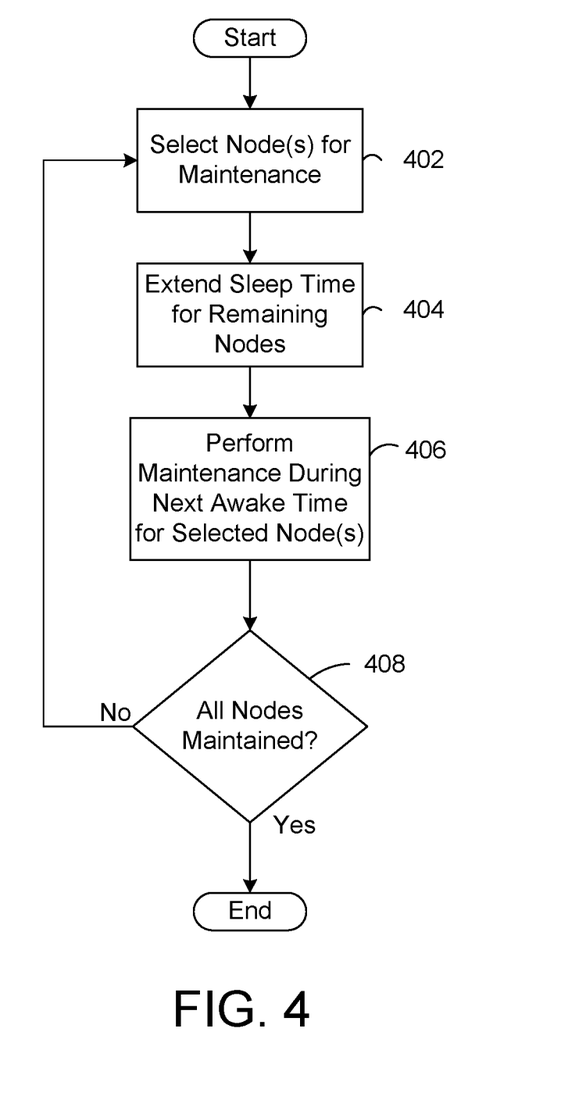
FIG. 4 shows an embodiment of a process for upgrading network nodes in a communication network.

FIG. 4 shows an embodiment of a process for upgrading network nodes 14, 16, 18, and 20 in a communication network 10. Once the node management device 12 decides that maintenance (e.g., software or configuration updates) should be performed on the network nodes 14, 16, 18, and 20, the node management device 12 selects a network node to receive maintenance (step 402). The node maintenance device 12 can make the decision to perform maintenance and select the network node to receive maintenance prior to or at the start of a check-in cycle (an exemplary check-in cycle is shown in FIG. 6A). In addition, the node maintenance device 12 determines how long the required maintenance for one network node will take to complete (referred to as a maintenance window).

Once the network node has been selected for maintenance, the node management device 12 can extend the sleep time (i.e., the time the node remains in the sleep state) for the remaining network nodes (step 404) by a time period corresponding to the maintenance window. The node management device 12 can extend the sleep time for the non-maintained network nodes in the sleep command provided to the network nodes at the conclusion of their communication window ($N_1$-$N_x$) during the current check-in cycle. During the next check-in cycle, the node management device 12 can perform maintenance on the selected network node (step 406) by extending the awake period for the network node by a time period corresponding to the maintenance period. The node management device 12 can extend the awake time for the network node by delaying the transmission of the sleep command to the selected network node until the required maintenance has been completed. After performing the maintenance, the node management device 12 determines if all of the network nodes have been upgraded (step 408). If all of the network nodes have been maintained, the process ends. However, if less than all of the network nodes have been maintained, the process restarts with the node management device selecting another network node for maintenance. While the above description is directed to providing maintenance on one node at a time, it is to be understood that the process can be used to provide maintenance on more than one node (e.g., 2 or 3 nodes) at a time. If the process is used to perform maintenance on more than one node, the check-in cycle and corresponding sleep time for the nodes not receiving maintenance would have to be extended by an appropriate amount such that maintenance on more than one node can be performed.

Figure 6B:
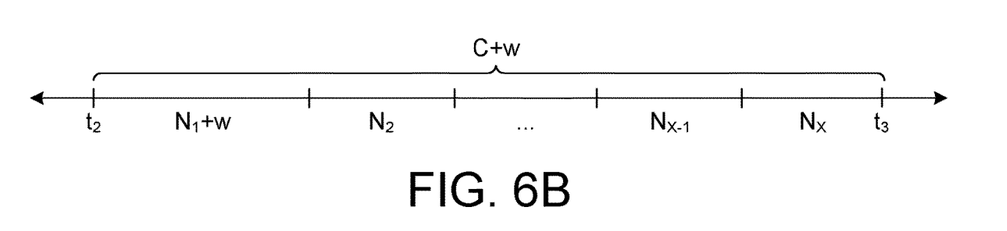
Figure 6C:
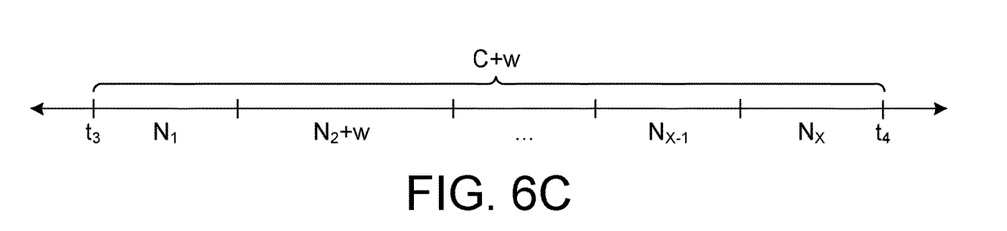

For example, referring to FIGS. 6A-6C, prior to or at the start of the check-in cycle of FIG. 6A, the node management device 12 can select the network node corresponding to the first communication window ($N_1$) of the check-in cycle. The node management device 12 can also determine that the maintenance window requires a maintenance time w to complete maintenance on the node. On the next check-in cycle, as shown in FIG. 6B, the check-in cycle can be extended to the time period equal to the check-in cycle time C plus the maintenance time w. In FIG. 6B, the communication window $N_1$ is extended by the maintenance time w so that maintenance can be performed on the network node during the communication window $N_1$. The remaining communication windows ($N_2$-$N_x$) are delayed by the maintenance time w (based on sleep commands provided by the node management device 12 during the prior check-in cycle) before they start communications with the node management device 12. Since the remaining nodes have not yet been maintained, the node management device 12 can select the network node corresponding to communication window $N_2$ to be maintained during the next check-in cycle and extend the sleep times of the remaining network nodes (including the network node associated with communication window $N_1$).

On the next check-in cycle, as shown in FIG. 6C, the check-in cycle can be extended to the time period equal to the check-in cycle time C plus the maintenance time w. In FIG. 6C, the communication window $N_2$ is extended by the maintenance time w so that maintenance can be performed on the network node during the communication window $N_2$. The remaining communication windows ($N_3$-$N_x$) are delayed by the maintenance time w before they start communications with the node management device. The communication window $N_1$ is also delayed by the maintenance time w (based on sleep commands provided by the node management device 12 during the prior check-in cycle), but the delay is incorporated into the prior check-in cycle since the communication window $N_1$ occurs prior to the maintenance window $N_2$ receiving maintenance. Since there are still nodes to be maintained, the node management device 12 can select the network node corresponding to the next communication window to be maintained during the next check-in cycle and extend the sleep times of the remaining network nodes. The node management device can repeat this process, as described above, until all of the network nodes receive the scheduled maintenance. While the above example describes maintaining the nodes in a sequence corresponding to the nodes' communication windows ($N_1$-$N_x$), the order in which the nodes are maintained can be performed in any desired order.

In another embodiment, the network nodes may be polled for information by the node management device 12. If the network nodes are polled, the network nodes would not receive an awake time from the node management device 12 at the end of the information transfer, but instead, the network nodes would be instructed to enter the sleep state and remain in the sleep state until awoken by the node management device 12 for the network node to transmit its information. The network nodes may include a "Wake-On-RF" mode that keeps the network nodes in a sleep state until the network nodes receive an appropriate "wake" signal from the node management device 12. In this embodiment, the node management device 12 can control, during each check-in cycle, when each of the network nodes that are not receiving maintenance are awake based on when the node management device 12 sends the "wake" signal to the network node.

Figure 5:
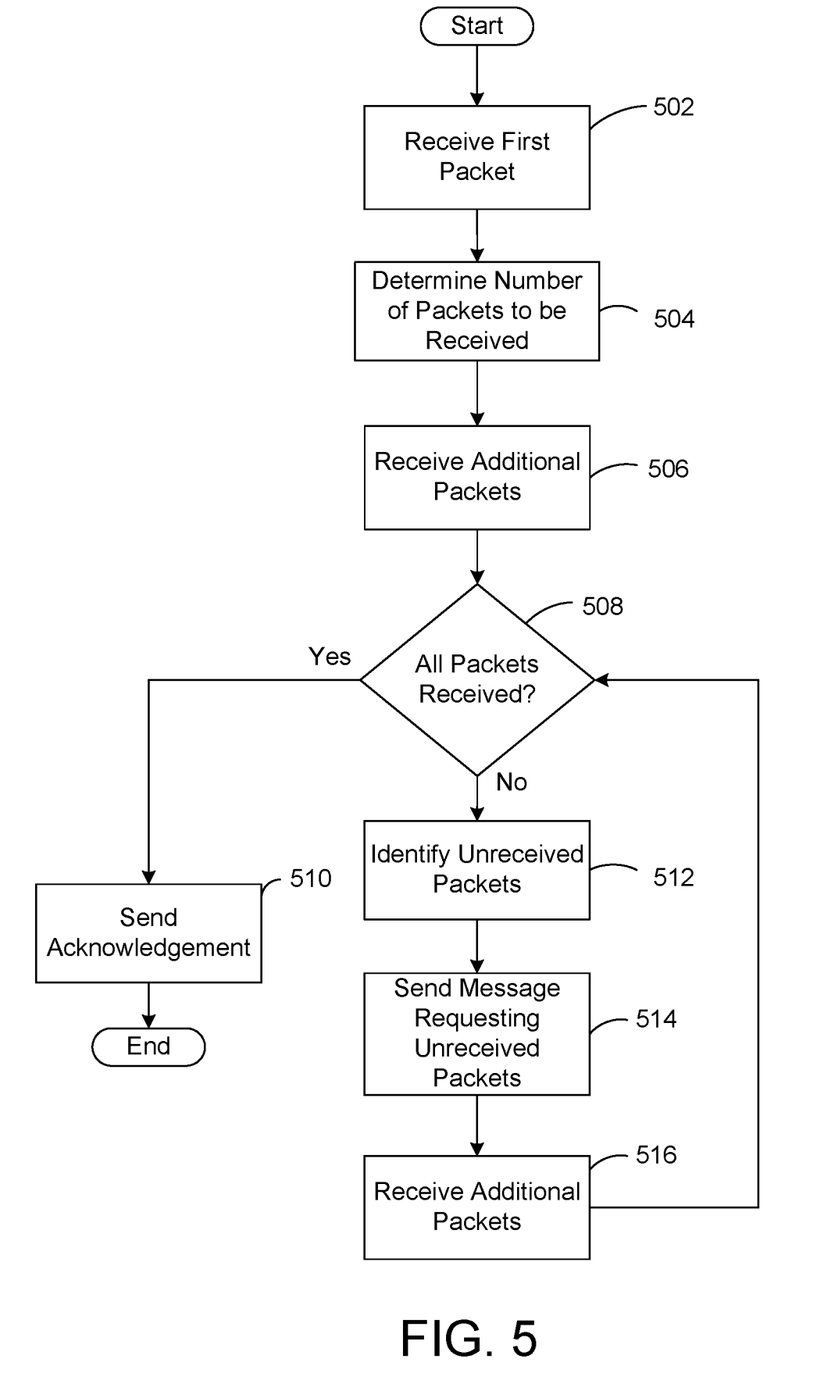
FIG. 5 shows an embodiment of a process for transmitting packets from a network node to a node management device.

FIG. 5 shows an embodiment of a process for transmitting packets from a network node to the node management device 12. The process begins with the node management device 12 receiving an initial (or first) packet from a network node (step 502) during the network node's communication window. In one embodiment, the initial packet sent by the network node can be a directed multicast message. After receiving the initial packet, the node management device sends an application layer acknowledgement to the network node indicating that the initial packet was received and establishing a communication channel between the network node and the node management device 12. The node management device 12 then determines the number of packets to be received from the network node (step 504). In one embodiment, the node management device 12 can determine the number of packets to be received based on information in the initial packet. For example, the initial packet may inform the node management device 12 on how many additional packets the network node is going to send to the node management device 12. In another example, the initial packet may inform the node management device on how much information is to be communicated and the node management device 12 can determine how many corresponding packets may be required to transmit the information.

The node management device 12 can then receive the additional packets from the network node (step 506) after the network node has received the acknowledgement from the node management device. In other words, the network node will not send the additional packets to the node management device 12 until the network node receives the acknowledgement from the node management device 12 confirming that the node management device is expecting the additional packets. In one embodiment, the node management device 12 can delay the sending of the acknowledgement in order to delay the sending of the additional packets by the network node. The additional packets can also be sent as directed multicast messages, except that the additional packets do not require acknowledgements, such as network (or protocol) acknowledgements and/or data link layer acknowledgements, from the node management device 12. After receiving the additional packets, the node management device 12 can then determine if all of the packets have been received (step 508) based on the expected number of packets to be received by the node management device 12. If all of the packets have been received by the node management device 12, the node management device 12 sends an acknowledgement to the network node (step 510) and the process ends. However, if the node management device 12 determines that less than all of the packets have been received, the node management device 12 identifies those packets that were not received (step 512). In one embodiment, the node management device 12 can determine missing or unreceived packets based on information in the packets received by the node management device 12. For example, the received packets may include a packet identifier (e.g., a packet identifier of 1 for the first packet sent after the initial packet) that provides information on the order in which the packet was sent by the network node. After identifying or determining the missing or unreceived packets, the node management device 12 sends a message to the network node informing the network node of only those packets that were not received by the node management device 12 (step 514). Once the network node receives the message from the node management device 12, the network node can retransmit the unreceived packets, which can then be received by the node management device 12 (step 516). The node management device 12 then determines if all packets were received by the node management device 12 as described above.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A method for performing node maintenance on a plurality of nodes in a communication network, the method comprising:
   selecting a node from a plurality of nodes communicatively coupled to a node management device to receive maintenance from the node management device;
   setting, by the node management device, a sleep time for each node of the plurality of nodes during a first check-in cycle for the plurality of nodes, wherein each node of the plurality of nodes has a corresponding communication window to communicate with the node management device during the first check-in cycle, and wherein the sleep times are defined such that each node of the plurality of nodes communicates with the node management device in the corresponding communication window for the node during the check-in cycle while the other nodes of the plurality of nodes are in a sleep state;

extending, by the node management device, the communication window of the selected node during a second check-in cycle subsequent to the first check-in cycle by adding a maintenance window to the communication window, wherein the maintenance window corresponds to a time period for performing maintenance on the selected node;

performing, by the node management device, maintenance on the selected node during the extended communication window for the selected node; and repeating the steps of selecting a node, setting a sleep time, extending the communication window, and performing maintenance until each node of the plurality of nodes has received maintenance from the node management device.

2. The method of claim 1, wherein the performing maintenance on the selected node includes at least one of performing a software upgrade or performing a configuration upgrade on the selected node.

3. The method of claim 1, wherein the setting a sleep time for each node includes:
setting a first sleep time for the selected node;
setting a second sleep time for the remaining nodes of the plurality of nodes; and
wherein the second sleep time is greater than the first sleep time.

4. The method of claim 3, wherein the second sleep time is greater than the first sleep time by the maintenance window corresponding to the time for performing maintenance on the selected node.

5. The method of claim 1, further comprises sending a sleep command with a sleep time to each node of the plurality of nodes upon an end of the corresponding communication window for the node during the first check-in cycle.

6. The method of claim 1, wherein selecting a node includes selecting a node based on the corresponding communication window for the node during the check-in cycle.

7. The method of claim 1, further comprises sending a sleep command to the selected node upon completion of maintenance on the selected node, wherein the sleep command includes the sleep time for the selected node.

8. The method of claim 1, wherein the second check-in cycle is greater than the first check-in cycle by the maintenance window corresponding to the time for performing maintenance on the selected node.

9. A communication network comprising:
a plurality of nodes; and
a node management device communicatively coupled to each node of the plurality of nodes, the node management device configured to control awake times and sleep times for each node of the plurality of nodes during a first check-in cycle, wherein each node of the plurality of nodes has a corresponding defined communication window to communicate with the node management device during the first check-in cycle while the other nodes of the plurality of nodes are in a sleep state, the node management device configured to select a node of the plurality of nodes for node maintenance and to set sleep times for each node of the plurality of nodes during the first check-in cycle, the node management device configured to extend the communication window of the selected node during a second check-in cycle by adding a maintenance window to the communication window, wherein the maintenance window corresponds to a time period for performing maintenance on the selected node, and the node management device configured to perform maintenance on the selected node during the extended communication window, and wherein the node management device is configured to perform maintenance on a respective one of the plurality of nodes during each check-in cycle of a plurality of check-in cycles until the plurality of nodes have received maintenance.

10. The network of claim 9, wherein the plurality of nodes are arranged in a star configuration.

11. The network of claim 9, wherein the node management device is configured to delay a transmission of a sleep command to the selected node until the maintenance has been performed on the node.

12. The network of claim 9, wherein the node management device is configured to perform maintenance on the plurality of nodes based on corresponding communication windows for the plurality of nodes during the check-in cycle.

13. The network of claim 9, wherein the node management device is configured to delay the communication windows of the other nodes of the plurality of nodes during the second check-in cycle by a time corresponding to the maintenance window to perform maintenance on the selected node.

14. The network of claim 9, wherein the node management device is configured to execute one of a software upgrade, a configuration upgrade, firmware upgrade, or user upgrade script of the selected node.

* * * * *